United States Patent
Arora et al.

(10) Patent No.: US 10,771,449 B2
(45) Date of Patent: Sep. 8, 2020

(54) METHOD AND SYSTEM FOR TRUSTWORTHINESS USING DIGITAL CERTIFICATES

(71) Applicant: Mastercard International Incorporated, Purchase, NY (US)

(72) Inventors: Ankur Arora, New Delhi (IN); Manish Kumar, Gurgaon (IN); Shuvam Sengupta, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 213 days.

(21) Appl. No.: 15/830,085

(22) Filed: Dec. 4, 2017

(65) Prior Publication Data

US 2019/0173872 A1 Jun. 6, 2019

(51) Int. Cl.
*H04L 29/06* (2006.01)
*G06Q 20/38* (2012.01)
(Continued)

(52) U.S. Cl.
CPC ....... *H04L 63/0823* (2013.01); *G06Q 20/223* (2013.01); *G06Q 20/3678* (2013.01); *G06Q 20/383* (2013.01); *G06Q 20/389* (2013.01); *G06Q 20/3825* (2013.01); *G06Q 20/4016* (2013.01); *H04L 63/0435* (2013.01);
(Continued)

(58) Field of Classification Search
CPC ............ H04L 63/0823; H04L 63/0435; H04L 63/0442; H04L 63/061
See application file for complete search history.

(56) References Cited

U.S. PATENT DOCUMENTS

| | | | |
|---|---|---|---|
| 10,057,225 B1* | 8/2018 | Hayes | H04W 12/0609 |
| 2015/0163217 A1* | 6/2015 | Lo | G06F 17/3053 |
| | | | 726/6 |

(Continued)

OTHER PUBLICATIONS

Notification of Transmittal of the International Search Report and the Written Opinion of the International Searching Authority (Forms PCT/ISA/220, PCT/ISA/210 and PCT/ISA/237) dated Feb. 12, 2019, by the European Patent Office in corresponding International Application No. PCT/US2018/058652. (11 pages).

*Primary Examiner* — Shin-Hon (Eric) Chen
*Assistant Examiner* — Jessica J South
(74) *Attorney, Agent, or Firm* — Buchanan Ingersoll & Rooney PC

(57) ABSTRACT

A method for generating digital certificates for anonymous users in blockchain transactions includes: storing a blockchain comprised of a plurality of blocks, each block including a block header and transaction values, where each transaction value includes data related to a blockchain transaction including a sending address, recipient address, and transaction amount; receiving a certificate request from a computing device, the request including a user public key of a cryptographic key pair; identifying a subset of transaction values in the blockchain where the sending address or recipient address was generated using the user public key; determining a confidence level based on the data included in each transaction value included in the subset; generating a digital certificate based on the determined confidence level; and transmitting the generated digital certificate to the computing device.

16 Claims, 8 Drawing Sheets

(51) Int. Cl.
  *G06Q 20/36*      (2012.01)
  *G06Q 20/40*      (2012.01)
  *G06Q 20/22*      (2012.01)

(52) U.S. Cl.
  CPC ........ *H04L 63/0442* (2013.01); *H04L 63/061* (2013.01); *G06Q 2220/00* (2013.01)

(56) References Cited

U.S. PATENT DOCUMENTS

| | | |
|---|---|---|
| 2016/0098723 A1 | 4/2016 | Feeney |
| 2016/0253663 A1 | 9/2016 | Clark et al. |
| 2017/0180134 A1* | 6/2017 | King .................. H04L 63/0853 |
| 2018/0262493 A1* | 9/2018 | Andrade ................ H04L 63/08 |
| 2018/0262504 A1* | 9/2018 | Frederick .............. H04L 9/3268 |

* cited by examiner

METHOD AND SYSTEM FOR TRUSTWORTHINESS USING DIGITAL CERTIFICATES

FIELD

The present disclosure relates to the measuring of trustworthiness in blockchain transactions using digital certificates, specifically the generating of digital certificates based on transactional history on a blockchain for an anonymous entity for use by other entities for establishing an electronic indicator as a measure of trustworthiness in future transactions.

BACKGROUND

There are a variety of reasons that have led to blockchains seeing increased usage as a platform for electronic commerce. One notable reason that has led many to blockchains is anonymization: the identity of the user behind a blockchain wallet is kept anonymous. There are many cases where an individual or other entity may wish to keep themselves anonymous when making a transaction, such as when purchasing gifts, buying embarrassing products, or merely a desire to keep their purchasing habits private. This has led to a number of individuals utilizing blockchain for e-commerce transactions where both parties are anonymous. In these cases, when a merchant or individual is transacting with another, the only knowledge they may have of the other party to the transaction is an address of their electronic wallet or public key.

While the anonymization may be beneficial for protecting a consumer's identity, it may also be detrimental for largely the same reason. The anonymous nature of traditional blockchain transactions is such that a consumer does not know who they are transacting with, and thus may be transacting with an individual or entity that is less than trustworthy or that may be attempting to take advantage of the consumer. In traditional e-commerce transactions, both parties are often aware of the identity of the other and will typically have several assurances as to the other party's trustworthiness: a consumer knows if a merchant has been around for a time and is still in business, while a merchant knows that if a consumer has authorized access to a transaction account than they can be trusted by that account's issuer. In addition, a payment network and issuing institution often work on behalf of a consumer to protect that consumer against fraud, by verifying identities and by also providing several types of recourse to a consumer if fraud is perpetuated. These measures often involve complex computer processes that are not possible by humans alone, not only because of the speed required, but the complexity of the electronic determinations and the number of form of the input variables. However, for blockchain transactions, there is no knowledge available to either party, and there is often no recourse available in the event that a problem occurs; once the transaction has been processed it is impossible to be reversed and there is no regulatory body that can enforce a payee to pay back the payor in such a distributed ledger system. As a result, each entity in a blockchain transaction has to take the other party at their word, and trust that the other party is representing themselves accurately, or perhaps more accurately accept the risk they are not.

The common ways of electronically assessing the risk of transactions between known parties cannot be translated into an environment where the parties are not known. And of course, for a commercial scale system, the electronic determination representing a measure of risk has to be fast, accurate and reliable, each factor posing a different technological challenge.

Thus, there is a need for a technological solution to provide for a way for two anonymous entities to provide evidence of trustworthiness to one another without compromising the anonymity, particularly with respect to blockchain transactions.

SUMMARY

The present disclosure provides a description of systems and methods for generating digital certificates and use thereof in an anonymous blockchain transaction. A computer system specifically configured to act as a trusted authority that electronically analyzes the transaction history of a specific electronic wallet on a blockchain to determine electronic representation of a level of confidence representative of the trustworthiness of that wallet in future transactions, based on past behavior with respect to double spending, insufficient funds, failure to complete a transaction after receipt of funds, delivery of inadequate or incorrect products or services, and other indicators of fraud or attempted fraud. The trusted authority generates and signs digital certificates for each electronic wallet that electronically indicates a value or variable that signifies the confidence level identified for that wallet. The wallets are then free to share these digital certificates with one another when attempting a transaction, where one entity is free to validate the certificate provided by another entity and determine if they would like to move forward with the transaction having the evidence regarding the other entity's trustworthiness. Thus, the systems and methods discussed herein enable trustworthiness for anonymous users in a blockchain to be identified and used by parties engaging in a transaction without compromising user anonymity at any point in the process.

A method for generating digital certificates for anonymous users in blockchain transactions includes: storing, in a memory of a processing server, a blockchain, wherein the blockchain is comprised of a plurality of blocks, each block including a block header and one or more transaction values, where each transaction value includes data related to a blockchain transaction including at least a sending address, a recipient address, and a transaction amount; receiving, by a receiving device of the processing server, a certificate request from a computing device, wherein the certificate request includes at least a user public key of a cryptographic key pair; executing, by a querying module of the processing server, a query on the memory to identify a subset of transaction values included in the blockchain where the included sending address or recipient address was generated using the user public key; determining, by a determination module of the processing server, a confidence level based on at least the data included in each transaction value included in the subset; generating, by a generation module of the processing server, a digital certificate based on the determined confidence level; and electronically transmitting, by a transmitting device of the processing server, the generated digital certificate to the computing device.

A method for use of a digital certificate in an anonymous blockchain transaction includes: storing, in a memory of a computing device, at least a server public key, a confidence threshold, one or more source addresses, and a cryptographic key pair comprised of a user public key and a user private key; receiving, by a receiving device of the computing device, at least a recipient address and a signed digital certificate from a secondary computing device, wherein the signed digital signature includes at least a confidence level; verifying, by a verification module of the computing device, a digital signature of the signed digital certificate using the server public key; generating, by a generation module of the computing device, a user signature over a blockchain transaction using the user private key, wherein the blockchain transaction includes at least the one or more source addresses, the recipient address, and a transaction amount; and electronically transmitting, by a transmitting device of the computing device, the blockchain transaction and user signature to a node associated with a blockchain, wherein the user signature and the blockchain transaction are electronically transmitted if the confidence level included in the signed digital certificate is above the confidence threshold, or, if the confidence level included in the signed digital certificate is below the confidence threshold, input is received by an input device interfaced with the computing device from a user of the computing device indicating approval to proceed with the blockchain transaction.

A system for generating digital certificates for anonymous users in blockchain transactions includes: a memory of a processing server configured to store a blockchain, wherein the blockchain is comprised of a plurality of blocks, each block including a block header and one or more transaction values, where each transaction value includes data related to a blockchain transaction including at least a sending address, a recipient address, and a transaction amount; a receiving device of the processing server configured to receive a certificate request from a computing device, wherein the certificate request includes at least a user public key of a cryptographic key pair; a querying module of the processing server configured to execute a query on the memory to identify a subset of transaction values included in the blockchain where the included sending address or recipient address was generated using the user public key; a determination module of the processing server configured to determine a confidence level based on at least the data included in each transaction value included in the subset; a generation module of the processing server configured to generate a digital certificate based on the determined confidence level; and a transmitting device of the processing server configured to electronically transmit the generated digital certificate to the computing device.

A system for use of a digital certificate in an anonymous blockchain transaction includes: a memory of a computing device configured to store at least a server public key, a confidence threshold, one or more source addresses, and a cryptographic key pair comprised of a user public key and a user private key; a receiving device of the computing device configured to receive at least a recipient address and a signed digital certificate from a secondary computing device, wherein the signed digital signature includes at least a confidence level; a verification module of the computing device configured to verify a digital signature of the signed digital certificate using the server public key; a generation module of the computing device configured to generate a user signature over a blockchain transaction using the user private key, wherein the blockchain transaction includes at least the one or more source addresses, the recipient address, and a transaction amount; and a transmitting device of the computing device configured to electronically transmit the blockchain transaction and user signature to a node associated with a blockchain, wherein the user signature and the blockchain transaction are electronically transmitted if the confidence level included in the signed digital certificate is above the confidence threshold, or, if the confidence level included in the signed digital certificate is below the confidence threshold, input is received by an input device interfaced with the computing device from a user of the computing device indicating approval to proceed with the blockchain transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Determining Trustworthiness in Anonymous Blockchain Transactions

Figure 1:
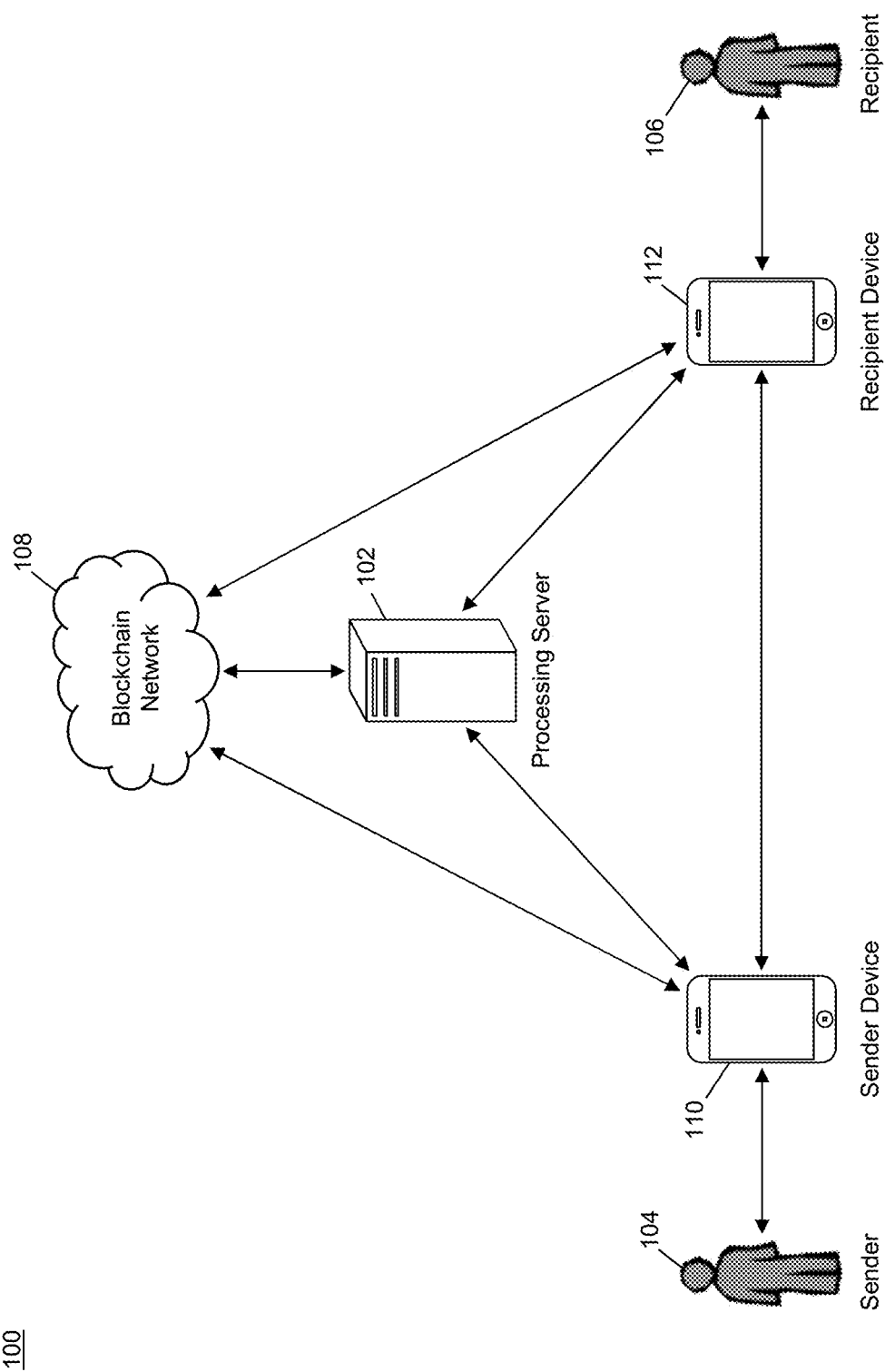
FIG. 1 is a block diagram illustrating a high level system architecture for generating and using digital certificates for trustworthiness in a blockchain in accordance with exemplary embodiments.

FIG. 1 illustrates a system 100 for the generating and usage of digital certificates for establishing user trustworthiness for anonymous users as part of a blockchain transaction.

The system 100 may include a processing server 102. The processing server 102, discussed in more detail below, may be configured to generate digital certificates that indicate the trustworthiness of an electronic wallet and/or user of the electronic wallet with respect to transactions conducted via the electronic wallet on a blockchain. In the system 100, a sender 104 and recipient 106 may wish to conduct a new blockchain transaction for the transfer of some amount of blockchain currency or other type of transaction conducted via blockchain between the sender 104 and recipient 106. The processing server 102 may be configured to generate a digital certificate for the sender 104 and recipient 106 (e.g., or electronic wallets associated therewith) based on past transaction history using the blockchain that may indicate the respective user's/wallet's trustworthiness. The sender 104 and recipient 106 may thus exchange digital certificates, which may be evaluated by each entity to determine if they want to go through with the transaction. As discussed herein, senders 104 and recipients 106 may refer to the electronic wallets that may be used by each respective entity on a blockchain, where "electronic wallet" and "sender" or "recipient" may refer to the wallet itself or individual, respectively, or vice versa.

In the system 100, a blockchain may be operated via a blockchain network 108. The blockchain network 108 may be comprised of a plurality of nodes (not shown), where each node is configured to generate new blocks for the blockchain, exchange newly generated blocks with other nodes, validate blocks generated by other nodes, and maintain a copy of the blockchain. A node may be any type of computing device that is specifically configured to perform the functions of a blockchain node. In some embodiments, the processing server 102 may be a node that is part of the blockchain network 108. In other embodiments, the processing server 102 may be a separate computing system that may be in communication with one or more nodes in the blockchain network 108 to receive the blockchain or data included therein.

The blockchain may be comprised of a plurality of blocks, where each block includes at least a block header and one or more transaction data values. Each block header may include at least a timestamp, a block reference value, and a transaction reference value. The timestamp may be a time at which the block and/or block header was generated, and may be formatted in any suitable format, such as a UNIX timestamp, using a DateTime object, etc. Each transaction data value may be related to a blockchain transaction and include at least a currency amount that is transferred as part of the transaction, a sending address from which the currency is transferred, and a receiving address to which the currency is transferred, as discussed in more detail below.

The block reference value may be a reference to the previous block added to the blockchain before its respective block, such as may be determined based on the timestamp. In one embodiment, the block reference value may be a hash value generated via a hashing, using one or more suitable algorithms, of the block header of the previous block. The transaction reference value may be a reference to the one or more transaction data values included in the same block. In one embodiment, the transaction reference value may be a hash value generated via a hashing, using one or more suitable algorithms, of the transaction data value(s) included in the block. In some embodiments, the transaction reference value may be the root of a Merkle tree generated using the one or more transaction data values. The use of reference values may ensure the immutability of the blockchain, as any attempted modification to a transaction data value or block header would require modification to that block's transaction reference value and to the block reference value included in every subsequent block header, which must be performed at every single node in the blockchain network 104 before a new block is generated and added to the blockchain. As a result, the blockchain is extremely resistant, if not completely protected, from tampering of transaction data values.

The system 100 may include a sender device 110. The sender device 110, discussed in more detail below, may be any type of computing device that is specifically configured to be suitable for performing the functions discussed here, such as a desktop computer, laptop computer, notebook computer, tablet computer, cellular phone, smart phone, smart watch, smart television, wearable computing device, implantable computing device, etc. The sender device 110 may have a wallet stored therein or otherwise accessible thereby. A blockchain wallet, as discussed herein, may refer to a private key of a cryptographic key pair that is used to generate digital signatures for blockchain transactions, to prove ownership of blockchain currency associated therewith for use in transacting using the blockchain network. For traditional blockchains, the owner of a wallet may be considered to be the entity in possession and/or control of that private key. In the system 100, the sender device 110 may store a private key, referred to herein as the sender private key, which may be used to prove ownership of blockchain currency that is to be paid as part of a proposed blockchain transaction.

The system 100 may also include a recipient device 112. The recipient device 112 may be another specifically configured computing device, such as the sender device 110, that stores a private key, referred to herein as the recipient private key, that may be a wallet to which the blockchain currency that is being paid as part of the proposed blockchain transaction is to be paid. As part of the cryptographic key pair, the recipient device 112 may have a corresponding recipient public key, which may be used to generate an address (also referred to herein as a "blockchain address") where the blockchain currency may be sent to as part of the transaction. The recipient private key may be used in a future transaction to prove the recipient device's ownership of that address, to thereby prove ownership of the transferred blockchain currency.

In the system 100, the sender 104 and recipient 106 may be interested in conducting a blockchain transaction for the transfer of some amount of currency from the sender 104 (e.g., the sender's electronic wallet stored in the sender device 110) to the recipient 106 (e.g., the recipient's electronic wallet stored in the recipient device 112). In order to determine if the other party to the transaction is trustworthy, each of the parties may request a digital certificate from the processing server 102 that indicates a confidence level for the respective party that is indicative of the trustworthiness of that party with respect to future blockchain transactions. To request a digital certificate, the sender 104 may, via the sender device 110, submit a request for a digital certificate to the processing server 102 using any suitable communication network and method. For example, the processing server 102 may have a web page through which the sender 104 may submit a request, or may be associated with an application program executed by the sender device 110 through which a digital certificate request may be submitted.

The digital certificate request may include at least the sender public key that part of the cryptographic key pair of the sender device 110 that includes the sender private key that serves as the sender's electronic wallet. In some cases, the digital certificate request may include any additional information associated with the sender's electronic wallet for use in identification of transactions associated therewith. For instance, the sender 104 may supply transaction identifiers for past blockchain transactions in which they participated. In some cases, the sender device 110 may generate a digital signature using the sender private key for inclusion in the digital certificate request, which may be validated by the processing server 102 using the sender public key to confirm that the sender 104 is the owner or an authorized user of the electronic wallet for which a digital certificate is requested.

The processing server 102 may receive the proposed blockchain transaction and may then identify one or more transaction data values in all of the plurality of blocks in the blockchain where the sending address or the receiving address is associated with the transacting cryptographic key pair that is associated with the transacting address in the proposed blockchain transaction. In other words, the processing server 102 may identify all prior transactions where the transacting entity was either the sender or the recipient.

The processing server 102 may receive the digital certificate request, and then determine a confidence level for the sender 104 that is used in the generation of a digital certificate for the sender 104. The processing server 102 may analyze the transaction history of the sender 104 (e.g., their electronic wallet) to identify instances of double spend (e.g., where currency was sent from the same address in two separate transactions) or of attempted double spend (e.g., where such was attempted but prevented by the nodes), instances where the sender 104 sent currency to or received currency from a fake address (e.g., where no other transactions involving that same wallet can be identified), instances where transactions were conducted rapidly (e.g., a receipt and sending or vice versa immediately back-to-back, which may indicate an attempt to defraud the blockchain network 108 or otherwise double spend), and variances in transaction amount (e.g., if this transaction is for drastically more than usually conducted via the transacting entity). This data may be considered against other transactions conducted by the sender 104 that are considered to be genuine (e.g., that lack indicators of fraud) to determine a confidence level, which may be a measure of the trustworthiness of the sender 104. The confidence level may thus represent, for instance, the likelihood that a new transaction conducted by the sender 104 will be successful and not determined to be fraudulent. In some cases, the processing server 102 may also take into account the overall frequency of transactions by the sender 104, or the frequency at the same time of day and/or day of week. In some cases, the processing server 102 may determine separate confidence levels for the sender 104 as a sender or recipient in a blockchain transaction based on the transaction history. For instance, a fraudster may not defraud any entities when receiving funds, but may regularly defraud entities when being relied upon to send funds. The actual confidence level can be a numeric indicator, for instance, on a scale of 1 to 100, with 1 indicating that the confidence is low and 100 indicating the confidence is high. The confidence level can be based on the percentage of all the sender's transactions that were satisfactory, perhaps with a weighting of transactions that are more clearly fraudulent. These can be translated into levels, as indicated in the next paragraph. There are of course other ways to generate a confidence level.

The processing server 102 may then generate a digital certificate based on the confidence level. In some embodiments, the digital certificate may include the confidence level determined for the sender 104. In other embodiments, the processing server 102 may be configured to generate different types of digital certificates (e.g., having different labels or other data that may be used by computing devices in the distinguishing thereof), where the type that is generated may be based on the confidence level. For instance, the processing server 102 may generate "bronze," "silver," and "gold" level digital certificates, which may indicate increasing trustworthiness for the electronic wallet, respectively.

In an exemplary embodiment, the processing server 102 may digitally sign the generated digital certificate prior to providing it to the sender device 110. The digital signature may be used to validate that the digital certificate is genuine as provided by the processing server 102 as a trusted entity. For instance, if the processing server 102 is a node in the blockchain network 108 or other trusted entity, the use of the digital signature will communicate to a sender 104 or recipient 106 that a digital certificate presented thereto was actually issued by that trusted entity, where the sender 104 or recipient 106 may implicitly trust the determination made by the processing server 102 due to their status as a trusted entity. The processing server 102 may possess a cryptographic key pair comprised of a private key and public key, referred to herein as a server private key and server public key, where the server private key may be used to generate the digital signature.

The processing server 102 may respond to the sender's 104 request for a digital certificate with the signed digital certificate indicating the sender's trustworthiness via the associated and/or included confidence level. In cases where separate digital certificates may be generated for an electronic wallet's trustworthiness as a sender and recipient, the processing server 102 may return both signed digital certificates to the sender device 110, or may generate and include only one of the digital certificates as requested by the sender 104 when submitting the request for the digital certificate. In embodiments where the digital certificate is signed, the sender device 110 may be configured to validate the digital signature using the server public key, which may be transmitted with the digital certificate or provisioned to the sender device 110 separately.

The sender device 110 may store the received, signed digital certificate(s) in a memory thereof. The recipient device 112 may similarly request a digital certificate from the processing server 102 by supplying the recipient public key and receiving a signed digital certificate from the processing server 102 indicating its own trustworthiness, which may be stored therein.

When the sender 104 and recipient 106 want to conduct a blockchain transaction, they may first exchange digital certificates, signed, if applicable, using the sender device 110 and recipient device 112 respectively. The sender device 110 and recipient device 112 may communicate using any suitable communication network and method, such as via the Internet, cellular communication, a local area network, Bluetooth, radio frequency, near field communication, etc. The sender device 110 may electronically transmit its signed digital certificate to the recipient device 106, and vice versa.

The sender device 110 may receive the signed digital certificate associated with the recipient 106 and validate the digital signature thereon using the server public key. Validation of the digital signature may indicate that the digital certificate is one that was genuinely generated by the processing server 102, and not fraudulently created or otherwise obtained. In some embodiments, a digital certificate may also include data identifying the electronic wallet to which it pertains, such as the digital signature generated by the private key for the electronic wallet that was validated by the processing server 102. In such embodiments, the recipient device 112 may provide its recipient public key to the sender device 110 with the digital certificate. In some cases, the signing of the digital certificate may itself indicate that the electronic wallet was successfully validated by the processing server 102 during the certificate generation process discussed above.

Once the digital certificate is validated, the sender device 110 may identify the confidence level of the recipient 106 based thereon. For instance, the confidence level may be included in the digital certificate, or the digital certificate itself may indicate the confidence level, such as based on its distinguishing characteristics or other data. The sender 104 may then decide to proceed with the blockchain transaction or cancel it accordingly. Similarly, the recipient 106 may make a decision as to whether or not to proceed with the transaction based on the sender's confidence level, determined based on the digital certificate provided by the sender device 110.

In some embodiments, the sender device 110 and/or recipient device 112 may be configured to prompt the respective user as to whether or not to proceed with a transaction. For instance, the sender device 110 may display the confidence level of the recipient 106, where the sender 104 may review the confidence level and provide an instruction to the sender device 110 as to whether or not to proceed. In other embodiments, the sender device 110 and/or recipient device 112 may be configured to automatically determine whether or not to proceed with a transaction based on the confidence level. For example, the sender device 110 may be configured to automatically proceed with any blockchain transaction where the confidence level of the other entity is above a predetermined threshold. Such a threshold may be set by the sender 104 or may be based on its own confidence level (e.g., it may approve all transactions with an entity having a confidence level at least equal to its own). In such embodiments, digital certificates that indicate a confidence level at or below the threshold may be automatically cancelled, or may prompt the sender 104 for approval before cancelling. In some instances, a separate threshold level may be used for outright cancellations, while the sender 104 may be prompted for instructions for confidence levels below the primary threshold but above the separate threshold. For instance, in the above example, the sender device 110 may automatically proceed with any transaction involving a recipient 106 having a gold confidence level, may automatically cancel any transaction involving a recipient 106 having a bronze confidence level, but may seek instructions from the sender 104 for recipients 106 having a silver confidence level.

If both the sender 104 and recipient 106 agree to proceed with the blockchain transaction, the transaction may be conducted via the sender device 110 and recipient device 112 using traditional methods. The blockchain network 108 may receive, via one of its nodes, the request for the new transaction, which may be processed and added to a new block that is validated and added to the blockchain. In some embodiments, when a new transaction is conducted, the processing server 102 may be configured to determine the confidence level for both electronic wallets involved taking into account the new transaction. If the confidence level is different from where it was prior to the transaction, the processing server 102 may generate and sign a new digital certificate that may be provided to the associated device. In some cases, the determination may be performed automatically by the processing server 102, such as any time a new transaction is added to the blockchain or at a predetermined interval (e.g., digital certificates may be updated on a daily, weekly, or monthly basis). In other cases, the sender device 110 or recipient device 112 may explicitly request an updated digital certificate as instructed by the respective user or performed at a predetermined interval.

The methods and systems discussed herein thus enable two anonymous parties in a blockchain be provided with trustworthiness of the other, for use in deciding whether or not to proceed with a blockchain transaction. The result is that all of the parties remain anonymous, while still allowing for a party to determine if the other is trustworthy using the digital certificate. The use of digital certificates to indicate trustworthiness may be useful as a simple conveyance of the trustworthiness of an electronic wallet without having to provide any additional information associated therewith that could potentially be detrimental to the anonymity granted via using the blockchain. In addition, when devices are configured to automatically proceed, or cancel, with transactions based on confidence level, the entire digital certificate request, receipt, validation, exchange, and use may be performed without requiring any participation or even knowledge by the user. Thus, the user experience may be maintained while significantly increasing the quality of transactions conducted by that user as well as that user's trustworthiness as conveyed to other parties, while still maintaining full anonymity.

Processing Server

Figure 2:
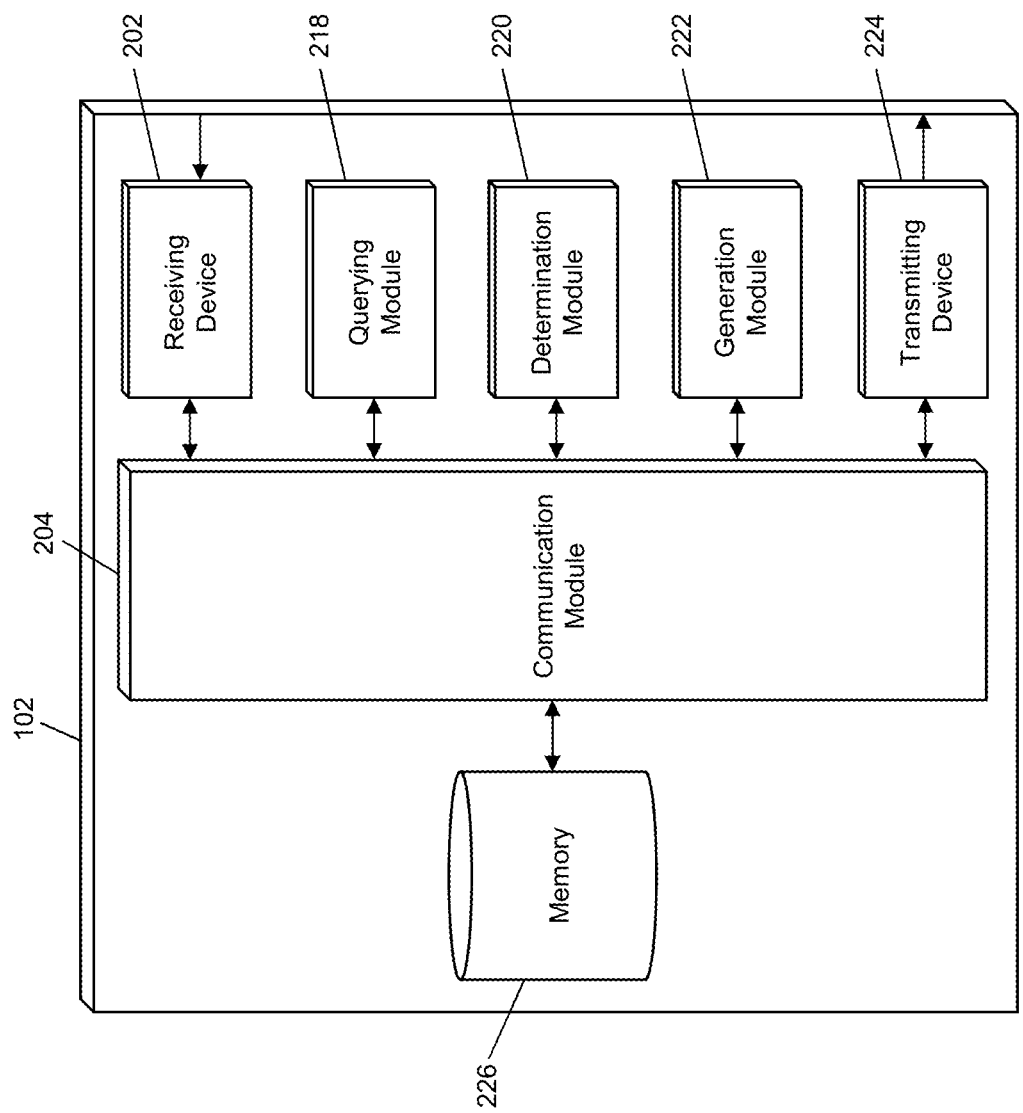
FIG. 2 is a block diagram illustrating the processing server of the system of FIG. 1 for generating digital certificates for anonymous users in blockchain transactions in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from blockchain networks 108, sender devices 110, recipient devices 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain networks 108 that are superimposed or otherwise encoded with blockchain data, including blocks and the data values included therein. In embodiments where the processing server 102 may be a node in the blockchain network 108, data signals electronically transmitted by the blockchain network 108 (e.g., other nodes thereof) may be superimposed or otherwise encoded with blocks for validation. The receiving device 202 may also be configured to receive data signals electronically transmitted by sender devices 110 and recipient devices 112, which may be superimposed or otherwise encoded with digital certificate requests, which may include at least a public key associated with an electronic wallet for which a digital certificate is requested. In some cases, such a request may also include a digital signature generated via the electronic wallet's private key.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, determination module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, algorithms for determining confidence level, a server private key and server public key, digital certificate types, certificate generation algorithms, etc.

The processing server 102 may include a querying module 218. The querying module 218 may be configured to execute queries on databases to identify information. The querying module 218 may receive one or more data values or query strings, and may execute a query string based thereon on an indicated database, such as the memory 226, to identify information stored therein. The querying module 218 may then output the identified information to an appropriate engine or module of the processing server 102 as necessary. The querying module 218 may, for example, execute a query on memory 226 to identify all blockchain transactions in blockchain data that involve an electronic wallet based on the public key received in a digital certificate request.

The processing server 102 may also include a determination module 220. The determination module 220 may be configured to determine a confidence level based on blockchain transaction data for the processing server 102. The determination module 220 may receive blockchain transaction data as input, may determine a confidence level based thereon, and may output the confidence level to another module or engine of the processing server 102. For example, the determination module 220 may determine the confidence level associated with an electronic wallet based on number or frequency of double spend transactions, number or frequency of fraudulent transactions, number or frequency of declined transactions, frequency of transactions, geographic location of transactions, number of unique internet protocol addresses used in transactions, etc. In some embodiments, the determination module 220 may be configured to determine validity of a digital signature, which may be done using a public key associated with the private key used to generate the digital signature. For instance, the determination module 220 may validate a digital signature included in a digital certificate request using the public key included therein.

The processing server 102 may also include a generation module 222. The generation module 222 may be configured to generate digital certificates and other data for the processing server 102 as discussed herein. The generation module 222 may receive instructions as input, may generate data based on the instructions, and may output the generated data to other modules or engines of the processing server 102. In some embodiments, the input may include data to be used by the generation module 222, such as a determined confidence level. In other embodiments, the generation module 222 may be configured to identify data for use in fulfilling the instructions. The generation module 222 may be configured to, for example, generate a digital certificate based on a determined confidence level. In some cases, the generation module 222 may also be configured to generate a digital signature for a digital certificate using a server private key and a suitable key generation algorithm. In embodiments where the processing server 102 may be a node in the blockchain network 108, the generation module 222 may be further configured to perform functions associated therewith, such as the generation of block headers, new blocks, block reference values, data reference values, etc.

The processing server 102 may also include a transmitting device 224. The transmitting device 224 may be configured to transmit data over one or more networks via one or more network protocols. In some instances, the transmitting device 224 may be configured to transmit data to blockchain networks 108, sender devices 110, recipient devices 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to blockchain networks 108, which may be superimposed or otherwise encoded with requests for blockchain data. In embodiments where the processing server 102 is a node in the blockchain network 108, data signals electronically transmitted to blockchain networks 108 (e.g., other nodes included therein) may be superimposed or otherwise encoded with newly generated blocks or validations of newly generated blocks. The transmitting device 224 may also be configured to electronically transmit data signals to sender devices 110 and recipient devices 112 that are superimposed or otherwise encoded with digital certificates, which, in some cases, may be digitally signed by the processing server 102.

Sender Device

Figure 3:
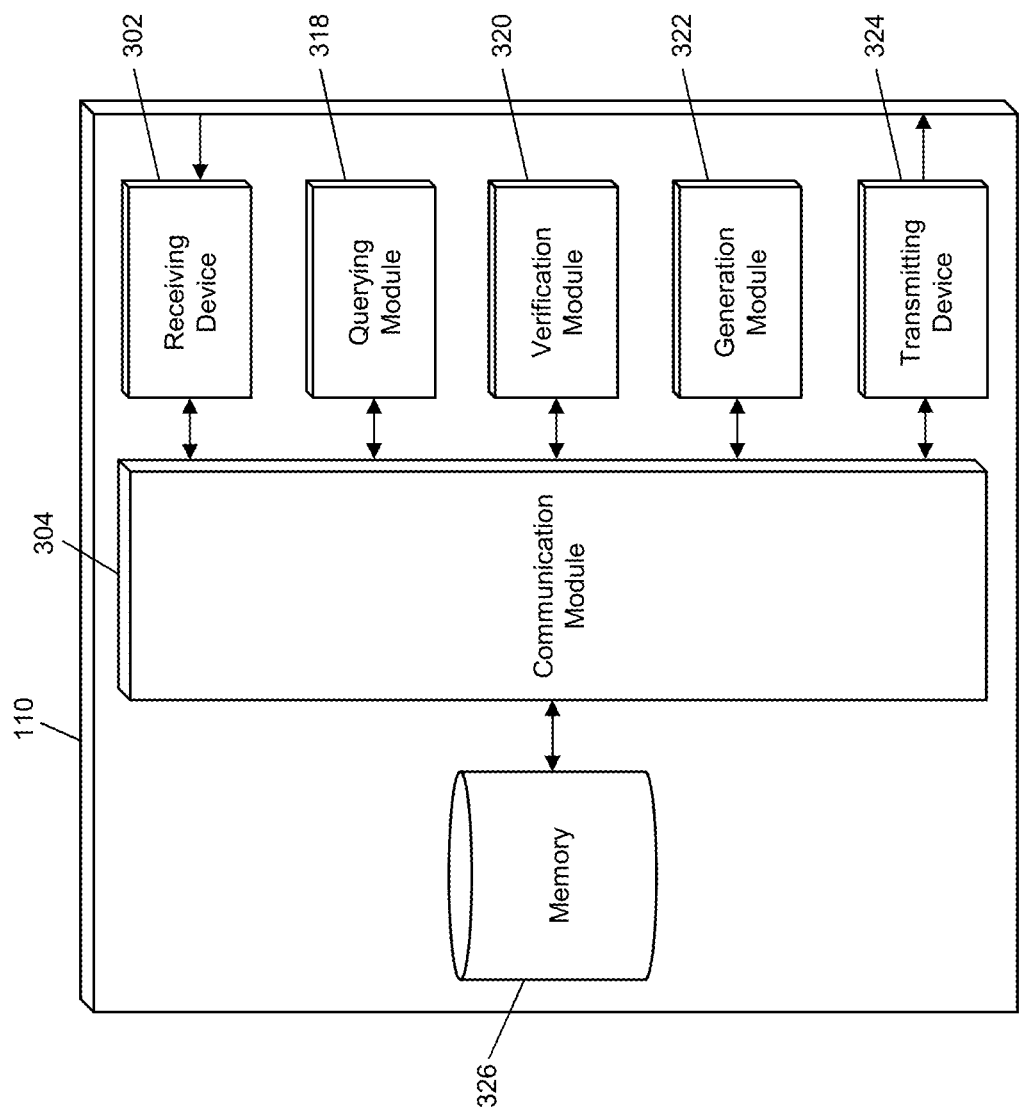
FIG. 3 is a block diagram illustrating a computing device of the system of FIG. 1 for the use of digital certificates in an anonymous blockchain transaction in accordance with exemplary embodiments.

FIG. 3 illustrates an embodiment of a sender device 110 in the system 100. It will be apparent to persons having skill in the relevant art that the embodiment of the sender device 110 illustrated in FIG. 3 is provided as illustration only and may not be exhaustive to all possible configurations of the sender device 110 suitable for performing the functions as discussed herein. For example, the computer system 800 illustrated in FIG. 8 and discussed in more detail below may be a suitable configuration of the sender device 110. It will be further apparent to persons having skill in the relevant art that the configuration in FIG. 3 may also be applicable to a recipient device 112.

The sender device 110 may include a receiving device 302. The receiving device 302 may be configured to receive data over one or more networks via one or more network protocols. In some instances, the receiving device 302 may be configured to receive data from blockchain networks 108, processing servers 102, recipient devices 112, and other systems and entities via one or more communication methods, such as radio frequency, local area networks, wireless area networks, cellular communication networks, Bluetooth, the Internet, etc. In some embodiments, the receiving device 302 may be comprised of multiple devices, such as different receiving devices for receiving data over different networks, such as a first receiving device for receiving data over a local area network and a second receiving device for receiving data via the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by blockchain networks 108 that are superimposed or otherwise encoded with data used in blockchain transactions, such as a verification of a submitted blockchain transaction. The receiving device 302 may also be configured to receive data signals electronically transmitted by processing servers 102 and recipient devices 112, which may be superimposed or otherwise encoded with a digital certificate, which, in some cases, may also be digitally signed. In some cases, data signals electronically transmitted by recipient devices 112 may also be superimposed or otherwise encoded with a recipient public key or blockchain address generated therefrom for use in a blockchain transaction.

The sender device 110 may also include a communication module 304. The communication module 304 may be configured to transmit data between modules, engines, databases, memories, and other components of the sender device 110 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the sender device 110 and external components of the sender device 110, such as externally connected databases, display devices, input devices, etc. The sender device 110 may also include a processing device. The processing device may be configured to perform the functions of the sender device 110 discussed herein as will be apparent to persons having skill in the relevant art. In some embodiments, the processing device may include and/or be comprised of a plurality of engines and/or modules specially configured to perform one or more functions of the processing device, such as a querying module 318, verification module 320, generation module 322, etc. As used herein, the term "module" may be software or hardware particularly programmed to receive an input, perform one or more processes using the input, and provides an output. The input, output, and processes performed by various modules will be apparent to one skilled in the art based upon the present disclosure.

The sender device 110 may also include a memory 326. The memory 326 may be configured to store data for use by the sender device 110 in performing the functions discussed herein, such as public and private keys, symmetric keys, etc. The memory 326 may be configured to store data using suitable data formatting methods and schema and may be any suitable type of memory, such as read-only memory, random access memory, etc. The memory 326 may include, for example, encryption keys and algorithms, communication protocols and standards, data formatting standards and protocols, program code for modules and application programs of the processing device, and other data that may be suitable for use by the sender device 110 in the performance of the functions disclosed herein as will be apparent to persons having skill in the relevant art. In some embodiments, the memory 326 may be comprised of or may otherwise include a relational database that utilizes structured query language for the storage, identification, modifying, updating, accessing, etc. of structured data sets stored therein. The memory 326 may be configured to store, for example, a signed digital certificate, blockchain data, the sender private key and sender public key, past blockchain addresses associated with currency available to the sender device 110, address generation algorithms, signature generation algorithms, a server public key, etc.

The sender device 110 may include a querying module 318. The querying module 318 may be configured to execute queries on databases to identify information. The querying module 318 may receive one or more data values or query strings, and may execute a query string based thereon on an indicated database, such as the memory 326, to identify information stored therein. The querying module 318 may then output the identified information to an appropriate engine or module of the sender device 110 as necessary. The querying module 318 may, for example, execute a query on memory 326 to identify a signed digital certificate received from the processing server 102 for providing to a recipient device 112 prior to a blockchain transaction, such as to prove the trustworthiness of the sender 104.

The sender device 110 may also include a verification module 320. The verification module 320 may be configured to perform verifications for the sender device 110. The verification module 320 may receive data to be verified as input, may attempt to verify the data, and may output a result of the verification to another module or engine of the sender device 110. For example, the verification module 320 may be configured to verify a digital signature of a digital certificate, such as by using a server public key provided by the processing server 102.

The sender device 110 may also include a generation module 322. The generation module 322 may be configured to generate blockchain addresses and other data for the sender device 110 as discussed herein. The generation module 322 may receive instructions as input, may generate data based on the instructions, and may output the generated data to other modules or engines of the sender device 110. In some embodiments, the input may include data to be used by the generation module 322, such as a recipient public key. In other embodiments, the generation module 322 may be configured to identify data for use in fulfilling the instructions. The generation module 322 may be configured to, for example, generate a blockchain address from a recipient public key for use in the transmission of digital currency thereto. The generation module 322 may also be configured to generate a digital signature, such as over a signed digital certificate or to be included in a certificate request, using the sender private key associated with the sender device's electronic wallet.

The sender device 110 may also include a transmitting device 324. The transmitting device 324 may be configured to transmit data over one or more networks via one or more network protocols. In some instances, the transmitting device 324 may be configured to transmit data to blockchain networks 108, processing servers 102, recipient devices 112, and other entities via one or more communication methods, local area networks, wireless area networks, cellular communication, Bluetooth, radio frequency, the Internet, etc. In some embodiments, the transmitting device 324 may be comprised of multiple devices, such as different transmitting devices for transmitting data over different networks, such as a first transmitting device for transmitting data over a local area network and a second transmitting device for transmitting data via the Internet. The transmitting device 324 may electronically transmit data signals that have data superimposed that may be parsed by a receiving computing device. In some instances, the transmitting device 324 may include one or more modules for superimposing, encoding, or otherwise formatting data into data signals suitable for transmission.

The transmitting device 324 may be configured to electronically transmit data signals to blockchain networks 108, which may be superimposed or otherwise encoded with a blockchain transaction, including at least one or more sending addresses, the digital signature of the sender device's electronic wallet, a recipient address, and a transaction amount. The transmitting device 324 may also be configured to electronically transmit data signals to processing server 102, which may be superimposed or otherwise encoded with a digital certificate request, which may include the sender public key and may also include a digital signature generated by the sender private key. The transmitting device 324 may also be configured to electronically transmit data signals to recipient devices 112, which may be superimposed or otherwise encoded with a digital certificate issued to the sender device 110 by the processing server 102, which may be signed thereby.

Process for the Provisioning of a Digital Certificate

Figure 4:
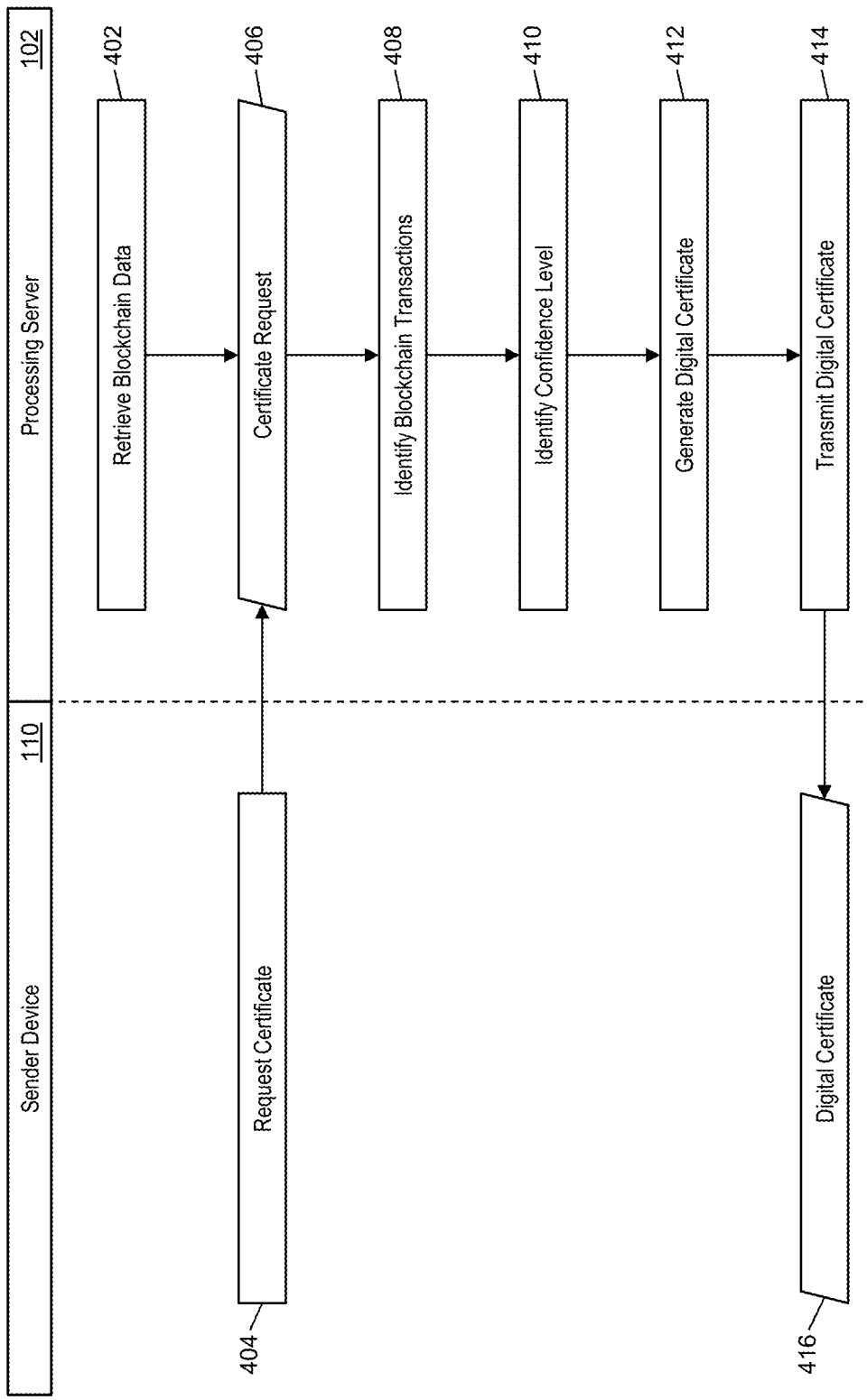
FIG. 4 is a flow diagram illustrating a process for the generation and provisioning of a digital certificate indicating trustworthiness in a blockchain for an anonymous user using the system of FIG. 1 in accordance with exemplary embodiments.

FIG. 4 illustrates a process for the generation of a digital certificate by the processing server 102 for the sender device 110 in the system 100 of FIG. 1 for provisioning thereto to represent the sender's trustworthiness in blockchain transactions.

In step 402, the processing server 102 may retrieve blockchain data from the blockchain network 108, such as by transmitting (e.g., via the transmitting device 224) a request for blockchain data to the blockchain network 108 or receiving (e.g., via the receiving device 202) blockchain data form other nodes in the blockchain network 108 in embodiments where the processing server 102 is a node in the blockchain network 108. In step 404, the transmitting device 324 of the sender device 110 may electronically transmit a certificate request to the processing server 102, where the certificate request may include at least a sender public key, and in some instances, may also include a digital signature generated by the generation module 322 of the sender device 110 using the sender's private key. In step 406, the receiving device 202 of the processing server 102 may receive the request. In cases where the request includes a digital signature, the determination module 220 may determine that the digital certificate is valid using the sender public key.

In step 408, the querying module 218 of the processing server 102 may execute a query on the memory 226 of the processing server 102 to identify, from the retrieved blockchain data, a plurality of blockchain transactions involving the sender 104. The plurality of blockchain transactions may include transactions where the sending address or recipient address was generated using the sender public key. In cases where a specific certificate (e.g., for trustworthiness as sender or recipient) is requested, the plurality of blockchain transactions may only include those where the sender 104 acted as the corresponding party in the transaction. In step 410, the determination module 220 of the processing server 102 may determine a confidence level for the sender 104 based on the plurality of blockchain transactions, such as based on frequencies and numbers of double spend, fraudulent transactions, declined transactions, reversed transactions, etc.

In step 412, the generation module 222 of the processing server 102 may generate a digital certificate for the sender 104 based on the identified confidence level. In some cases, the digital certificate may include the confidence level. In other cases, the digital certificate may otherwise indicate the confidence level, such as based on a type or other characteristics of the digital certificate. In some embodiments, the generation module 222 of the processing server 102 may be configured to sign the digital certificate via the generation of a digital signature thereon using the server's private key. In step 414, the transmitting device 224 of the processing server 102 may electronically transmit the digital certificate, signed, if applicable, to the sender device 110. In some cases, the transmission may include the server public key. In step 416, the receiving device 302 of the sender device 110 may receive the digital certificate. In cases where it is signed, the verification module 320 of the sender device 110 may validate the digital signature using the server public key.

Process for Use of Digital Certificates in a Blockchain Transaction

Figure 5:
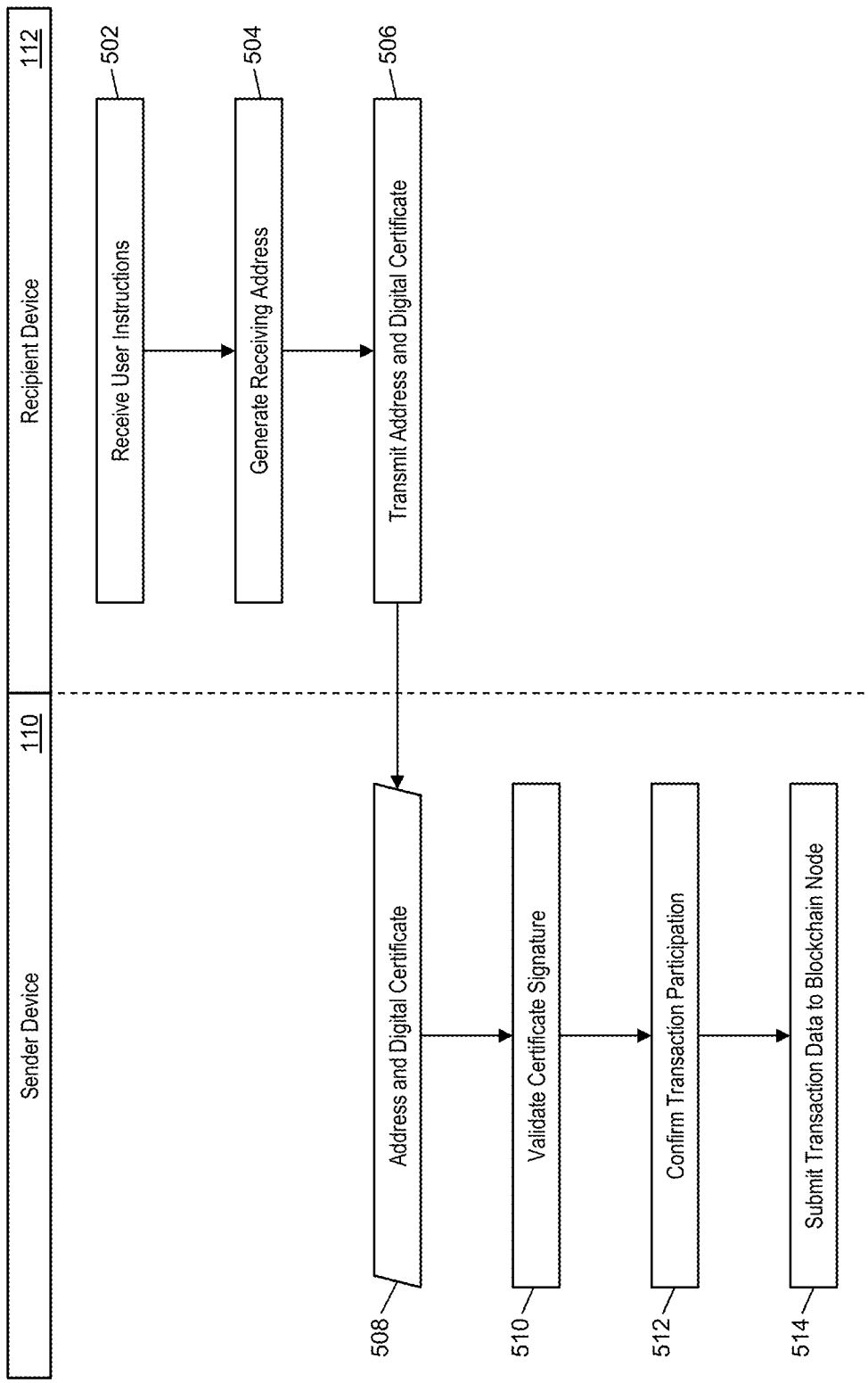
FIG. 5 is a flow diagram illustrating a process for the use of a digital certificate when engaging in an anonymous blockchain transaction using the system of FIG. 1 in accordance with exemplary embodiments.

FIG. 5 illustrates a process for the use of digital certificates in the system 100 for establishing trustworthiness between the sender 104 and recipient 106 for a blockchain transaction while retaining anonymity of the parties.

In step 502, a receiving device of the recipient device 112 may receive instructions input, via an input device interfaced therewith, by the recipient 106 requesting that information for a new blockchain transaction be provided to the sender device 110. As part of the providing of information, in step 504, a generation module of the recipient device 112 may generate a receiving blockchain address using the recipient public key associated with the recipient's electronic wallet. In step 506, a transmitting device of the recipient device 112 may electronically transmit, to the sender device 110, the receiving blockchain address and a signed digital certificate provisioned to the recipient device 112 by the processing server 102 (e.g., using the process illustrated in FIG. 4 and discussed above).

In step 508, the receiving device 302 of the sender device 110 may receive the receiving blockchain address and signed digital certificate. In step 510, the verification module 320 of the sender device 110 may verify the signature on the digital certificate using the server public key associated with the processing server 102, such as may have been previously provided to the sender device 110 with its own digital certificate.

In step 512, the sender device 110 may confirm that the sender 104 wants to participate in the proposed blockchain transaction based on the confidence level indicated by the recipient's digital certificate. In some embodiments, the sender device 110 may present the confidence level to the sender 104 and prompt the sender 104 for confirmation. In other embodiments, the sender device 110 may determine whether or not to proceed with the transaction based on the confidence level. In some cases, the sender device 110 may automatically confirm the participation if the confidence level is at or above a predetermined threshold. Once confirmation has been made, then, in step 514, the transmitting device 324 of the sender device 110 may submit transaction data to a node in the blockchain network 108, where the transaction data includes at least the receiving blockchain address, a transaction amount, one or more sending blockchain addresses identified by the sender device 110 (e.g., via the querying module 318 thereof) and a digital signature of the sender device 110 (e.g., generated by the generation module 322 thereof). The blockchain network 108 may then process the blockchain transaction using traditional methods and systems.

Figure 6:
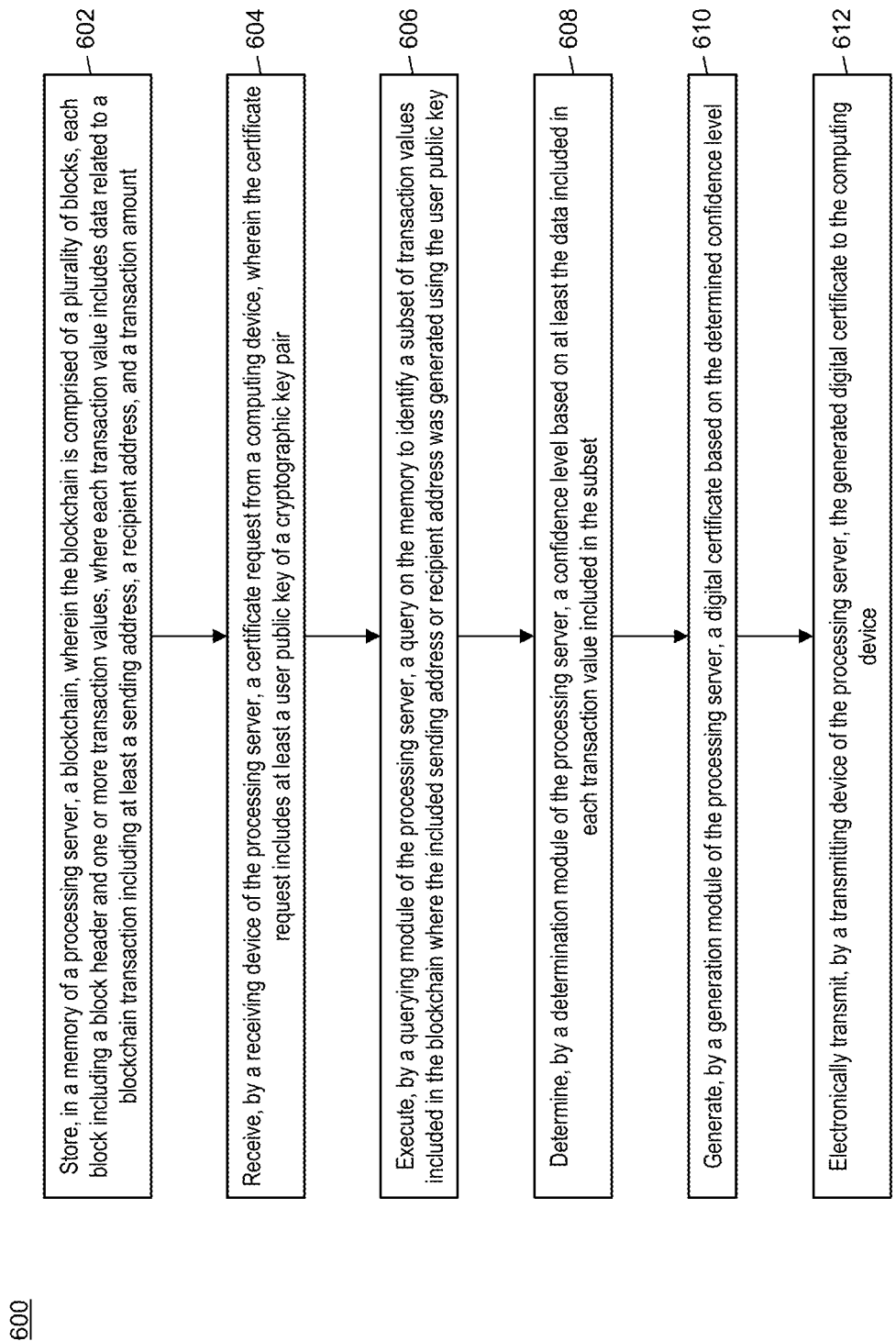
FIG. 6 is a flow chart illustrating an exemplary method for generating digital certificates for anonymous users in blockchain transactions in accordance with exemplary embodiments.

Exemplary Method for Generating Digital Certificates for Anonymous Users in Blockchain Transactions FIG. 6 illustrates a method 600 for the generation and provisioning of a digital certificate representative of a confidence level for an anonymous user in a blockchain transaction.

In step 602, a blockchain may be stored in a memory (e.g., the memory 226) of a processing server (e.g., the processing server 102), wherein the blockchain is comprised of a plurality of blocks, each block including a block header and one or more transaction values, where each transaction value includes data related to a blockchain transaction including at least a sending address, a recipient address, and a transaction amount. In step 604, a certificate request may be received by a receiving device (e.g., the receiving device 202) of the processing server from a computing device (e.g., the sender device 110 or recipient device 112), wherein the certificate request includes at least a user public key of a cryptographic key pair. In step 606, a query may be executed on the memory of the processing server by a querying module (e.g., the querying module 218) of the processing server to identify a subset of transaction values included in the blockchain where the included sending address or recipient address was generated using the user public key.

In step 608, a confidence level may be determined by a determination module (e.g., the determination module 220) of the processing server based on at least the data included in each transaction value included in the subset. In step 610, a digital certificate may be generated by a generation module (e.g., the generation module 222) of the processing server based on the determined confidence level. In step 612, the generated digital certificate may be electronically transmitted by a transmitting device (e.g., the transmitting device 224) of the processing server to the computing device.

In one embodiment, the method 600 may further include storing, in the memory of the processing server, a server cryptographic key pair comprised of a server public key and a server private key; generating, by the generation module of the processing server, a digital signature over the digital certificate using the server private key; and electronically transmitting, by the transmitting device of the processing server, the generated digital signature and the server public key to the computing device. In a further embodiment, the generated digital signature and the server public key may be electronically transmitted with the generated digital certificate. In some embodiments, the digital certificate may include the determined confidence level.

Figure 7:
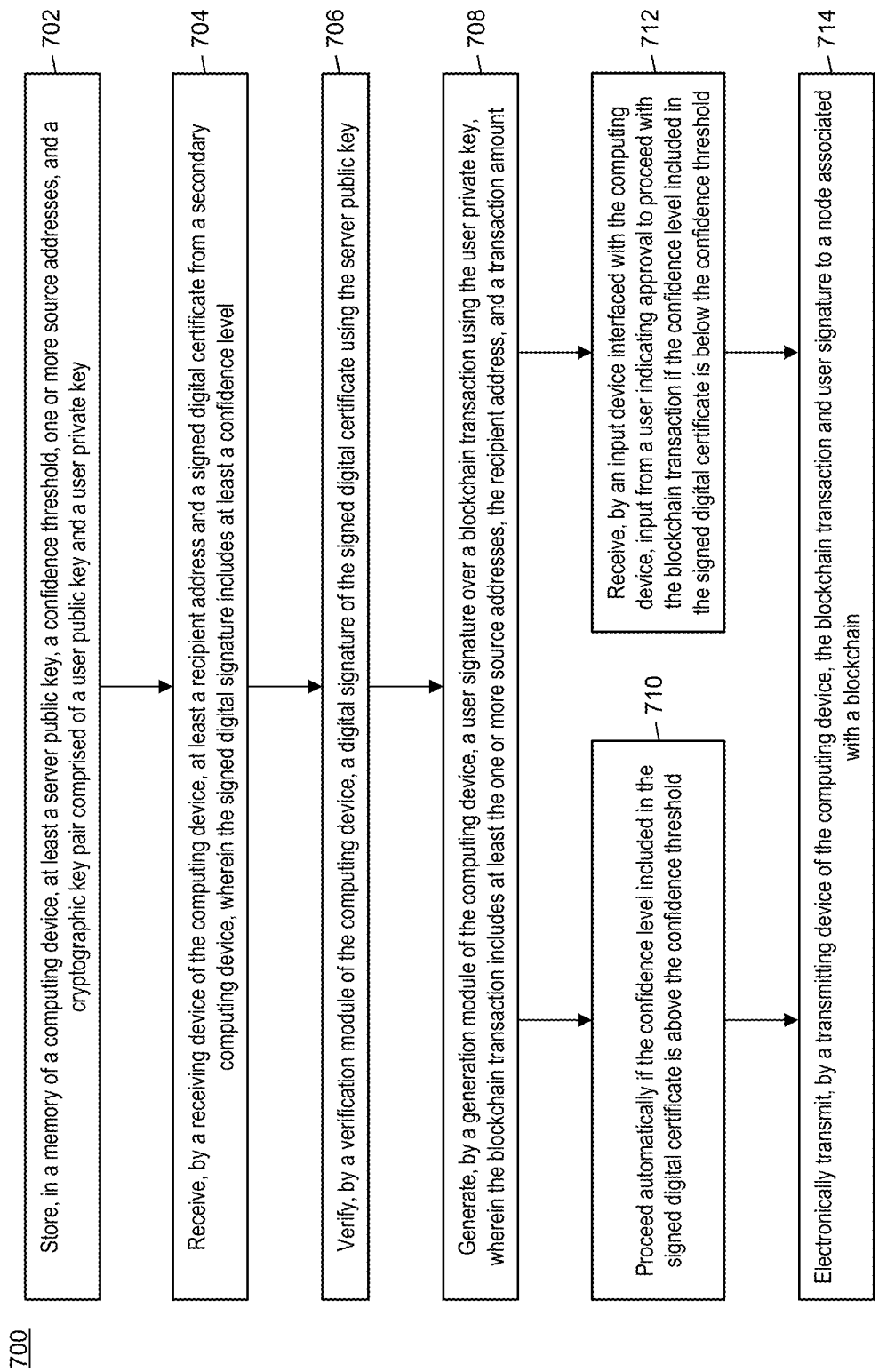
FIG. 7 is a flow chart illustrating an exemplary method for use of a digital certificate in an anonymous blockchain transaction in accordance with exemplary embodiments.

Exemplary Method for Use of a Digital Certificate in an Anonymous Blockchain Transaction FIG. 7 illustrates a method 700 for the use of a digital certificate in identifying trustworthiness of an anonymous party for determining whether or not to proceed in a blockchain transaction.

In step 702, at least a server public key, a confidence threshold, one or more addresses, and a cryptographic key pair comprised of a user public key and a user private key may be stored in a memory (e.g., the memory 326) of a computing device (e.g., the sender device 110 or recipient device 112). In step 704, at least a recipient address and a signed digital certificate may be received by a receiving device (e.g., the receiving device 302) of the computing device from a secondary computing device, wherein the signed digital signature includes at least a confidence level. In step 706, a digital signature of the signed digital certificate may be verified by a verification module (e.g., the verification module 320) of the computing device using the server public key. In step 708, a user signature may be generated by a generation module (e.g., the generation module 322) of the computing device over a blockchain transaction using the user private key, wherein the blockchain transaction includes at least the one or more source addresses, the recipient address, and a transaction amount.

If the confidence level included in the signed digital certificate is above the confidence threshold, then, in step 710, the blockchain transaction may be proceeded with automatically. If the confidence level included in the signed digital certificate is below the confidence threshold, then, in step 712, input may be received from a user (e.g., the sender 104 or recipient 106) from an input device (e.g., the receiving device 302) interfaced with the computing device indicating approval to proceed with the blockchain transaction. In step 714, the blockchain transaction and user signature may be electronically transmitted by a transmitting device (e.g., the transmitting device 324) of the computing device to a node associated with a blockchain.

In one embodiment, the method 700 may further include storing, in the memory of the computing device, a user digital certificate, wherein the user digital certificate includes a user confidence level; and electronically transmitting, by the transmitting device of the computing device, the user digital certificate to the secondary computing device prior to receipt of the recipient address and signed digital certificate. In some embodiments, the user signature and the blockchain transaction may be electronically transmitted if the confidence level included in the signed digital certificate is also above the user confidence level. In one embodiment, a recipient public key may be received in place of the recipient address, and the recipient address may be generated by the generation module of the computing device using the recipient public key.

Computer System Architecture

Figure 8:
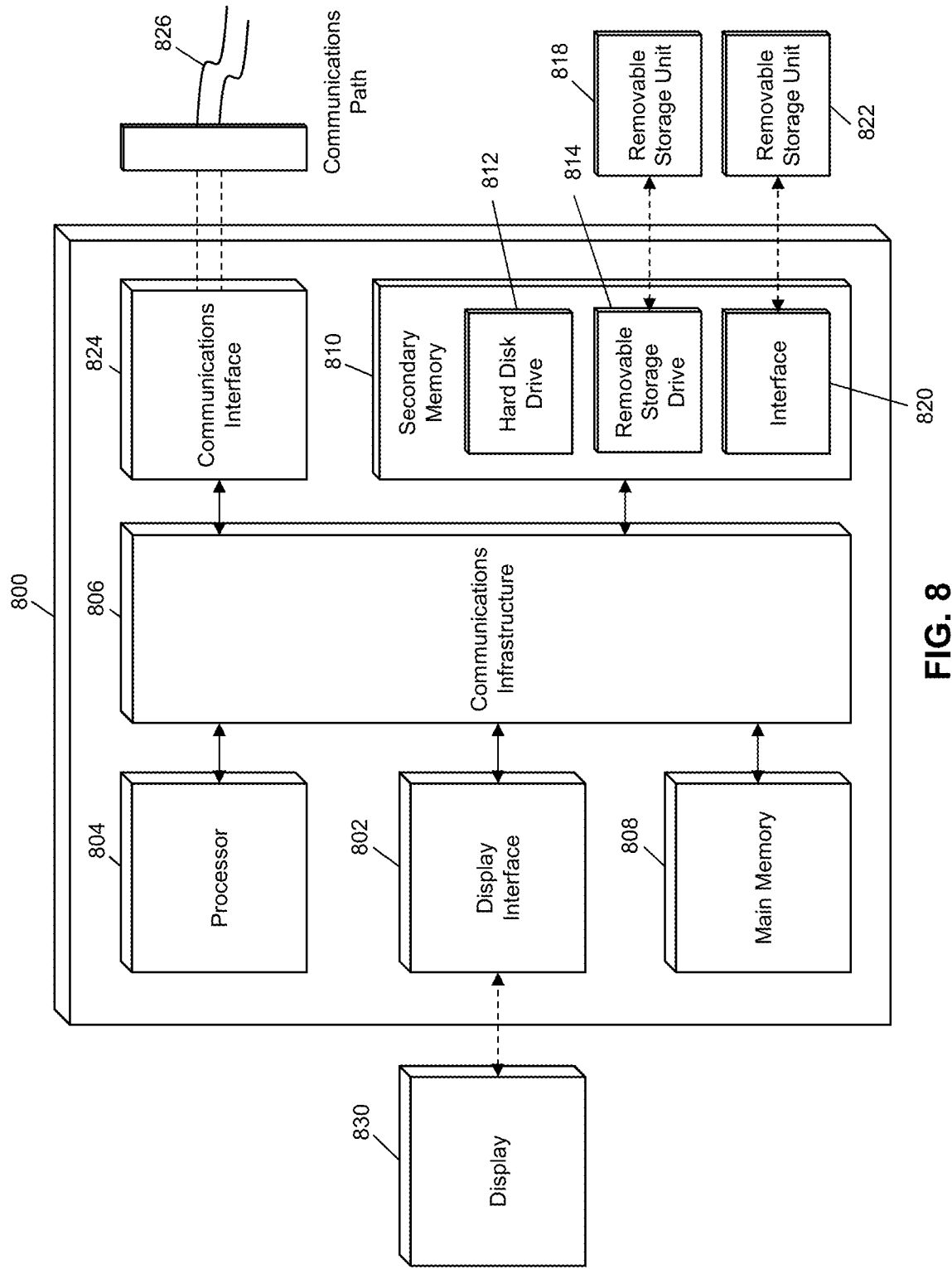
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102, sender device 110, and recipient device 1112 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system

800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for generating digital certificates for anonymous users in blockchain transactions and use of digital certificates in anonymous blockchain transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generating digital certificates for anonymous users in blockchain transactions, comprising:

storing, in a memory of a processing server, a blockchain, wherein the blockchain is comprised of a plurality of blocks, each block including a block header and one or more transaction values, where each transaction value includes data related to a blockchain transaction including at least a sending address, a recipient address, and a transaction amount;

receiving, by a receiving device of the processing server, a certificate request from a computing device, wherein the certificate request includes at least a user public key of a cryptographic key pair;

executing, by a querying module of the processing server, a query on the memory to identify a subset of transaction values included in the blockchain where the included sending address or recipient address was generated using the user public key;

determining, by a determination module of the processing server, a confidence level associated with the computing device based on at least the data included in each transaction value included in the subset;

generating, by a generation module of the processing server, a digital certificate based on the determined confidence level associated with the computing device; and electronically transmitting, by a transmitting device of the processing server, the generated digital certificate to the computing device, wherein responsive to the computing device engaging in a blockchain transaction with a secondary computing device, the computing device having sent the generated digital certificate to the secondary computing device, the generated digital certificate is configured to cause the secondary computing device to transmit the blockchain transaction to a node associated with the blockchain responsive to the determined confidence level associated with the computing device being equal to or above a confidence level associated with the secondary computing device.

2. The method of claim 1, further comprising:

storing, in the memory of the processing server, a server cryptographic key pair comprised of a server public key and a server private key;

generating, by the generation module of the processing server, a digital signature over the digital certificate using the server private key; and electronically transmitting, by the transmitting device of the processing server, the generated digital signature and the server public key to the computing device.

3. The method of claim 2, wherein the generated digital signature and the server public key are electronically transmitted with the generated digital certificate.

4. The method of claim 1, wherein the digital certificate includes the determined confidence level.

5. A method for use of a digital certificate in an anonymous blockchain transaction, comprising:

storing, in a memory of a computing device, at least a server public key, a confidence threshold, one or more source addresses, and a cryptographic key pair comprised of a user public key and a user private key; wherein the confidence threshold is based on a user confidence level associated with the computing device;

receiving, by a receiving device of the computing device, at least a recipient address and a signed digital certificate from a secondary computing device, wherein the signed digital signature includes at least a confidence level associated with the recipient address;

verifying, by a verification module of the computing device, a digital signature of the signed digital certificate using the server public key;

generating, by a generation module of the computing device, a user signature over a blockchain transaction using the user private key, wherein the blockchain transaction includes at least the one or more source addresses, the recipient address, and a transaction amount; and electronically transmitting, by a transmitting device of the computing device, the blockchain transaction and user signature to a node associated with a blockchain, wherein the user signature and the blockchain transaction are electronically transmitted if the confidence level associated with the recipient address included in the signed digital certificate is equal to or above the confidence threshold that is based on the user confidence level associated with the computing device, or, if the confidence level associated with the recipient address included in the signed digital certificate is below the confidence threshold that is based on the user confidence level associated with the computing device, input is received by an input device interfaced with the computing device from a user of the computing device indicating approval to proceed with the blockchain transaction.

6. The method of claim 5, further comprising:

storing, in the memory of the computing device, a user digital certificate, wherein the user digital certificate includes the user confidence level; and electronically transmitting, by the transmitting device of the computing device, the user digital certificate to the secondary computing device prior to receipt of the recipient address and signed digital certificate.

7. The method of claim 6, wherein the user signature and the blockchain transaction are electronically transmitted if the confidence level included in the signed digital certificate is also above the user confidence level.

8. The method of claim 5, wherein the recipient address is based on a recipient public key.

9. A system for generating digital certificates for anonymous users in blockchain transactions, comprising:

a memory of a processing server configured to store a blockchain, wherein the blockchain is comprised of a plurality of blocks, each block including a block header and one or more transaction values, where each transaction value includes data related to a blockchain transaction including at least a sending address, a recipient address, and a transaction amount;

a receiving device of the processing server configured to receive a certificate request from a computing device, wherein the certificate request includes at least a user public key of a cryptographic key pair;

a querying module of the processing server configured to execute a query on the memory to identify a subset of transaction values included in the blockchain where the included sending address or recipient address was generated using the user public key;

a determination module of the processing server configured to determine a confidence level associated with the computing device based on at least the data included in each transaction value included in the subset;

a generation module of the processing server configured to generate a digital certificate based on the determined confidence level associated with the computing device; and a transmitting device of the processing server configured to electronically transmit the generated digital certificate to the computing device, wherein responsive to the computing device engaging in a blockchain transaction with a secondary computing device, the computing device having sent the generated digital certificate to the secondary computing device, the generated digital certificate is configured to cause the secondary computing device to transmit the blockchain transaction to a node associated with the blockchain responsive to the determined confidence level associated with the computing device being equal to or above a confidence level associated with the secondary computing device.

10. The system of claim 9, wherein the memory of the processing server is further configured to store a server cryptographic key pair comprised of a server public key and a server private key;

the generation module of the processing server is further configured to generate a digital signature over the digital certificate using the server private key, and the transmitting device of the processing server is further configured to electronically transmit the generated digital signature and the server public key to the computing device.

11. The system of claim 10, wherein the generated digital signature and the server public key are electronically transmitted with the generated digital certificate.

12. The system of claim 9, wherein the digital certificate includes the determined confidence level.

13. A system for use of a digital certificate in an anonymous blockchain transaction, comprising:
- a memory of a computing device configured to store at least a server public key, a confidence threshold, one or more source addresses, and a cryptographic key pair comprised of a user public key and a user private key, wherein the confidence threshold is based on a user confidence level associated with the computing device;
- a receiving device of the computing device configured to receive at least a recipient address and a signed digital certificate from a secondary computing device, wherein the signed digital signature includes at least a confidence level associated with the recipient address;
- a verification module of the computing device configured to verify a digital signature of the signed digital certificate using the server public key;
- a generation module of the computing device configured to generate a user signature over a blockchain transaction using the user private key, wherein the blockchain transaction includes at least the one or more source addresses, the recipient address, and a transaction amount; and
- a transmitting device of the computing device configured to electronically transmit the blockchain transaction and user signature to a node associated with a blockchain, wherein the user signature and the blockchain transaction are electronically transmitted if the confidence level associated with the recipient address included in the signed digital certificate is equal to or above the confidence threshold that is based on the user confidence level associated with the computing device, or, if the confidence level associated with the recipient address included in the signed digital certificate is below the confidence threshold that is based on the user confidence level associated with the computing device, input is received by an input device interfaced with the computing device from a user of the computing device indicating approval to proceed with the blockchain transaction.

14. The system of claim 13, wherein the memory of the computing device is further configured to store a user digital certificate, wherein the user digital certificate includes the user confidence level; and the transmitting device of the computing device is further configured to electronically transmit the user digital certificate to the secondary computing device prior to receipt of the recipient address and signed digital certificate.

15. The system of claim 14, wherein the user signature and the blockchain transaction are electronically transmitted if the confidence level included in the signed digital certificate is also above the user confidence level.

16. The system of claim 13, wherein the recipient address is based on a recipient public key.

* * * * *